(12) United States Patent
Roddy et al.

(10) Patent No.: US 7,674,332 B2
(45) Date of Patent: *Mar. 9, 2010

(54) EXTENDED SETTABLE COMPOSITIONS COMPRISING CEMENT KILN DUST AND ASSOCIATED METHODS

(75) Inventors: Craig W. Roddy, Duncan, OK (US); Jilen Chatterji, Duncan, OK (US); Bobby J. King, Duncan, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/349,676

(22) Filed: Jan. 7, 2009

(65) Prior Publication Data

US 2009/0114126 A1  May 7, 2009

Related U.S. Application Data

(60) Division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
*C04B 18/08* (2006.01)
(52) U.S. Cl. .................. 106/716; 106/600; 106/692; 106/696; 106/707; 106/713; 106/714; 106/726; 106/772; 106/778; 106/823
(58) Field of Classification Search ................ 106/716, 106/600, 692, 696, 707, 713, 714, 726, 823
See application file for complete search history.

(56) References Cited

U.S. PATENT DOCUMENTS

| | | | |
|---|---|---|---|
| 2,094,316 A | 9/1937 | Cross et al. | |
| 2,329,940 A | 9/1943 | Ponzer | |
| 2,842,205 A | 7/1958 | Allen et al. | |
| 2,848,051 A | 8/1958 | Willaims | |
| 2,871,133 A | 1/1959 | Palonen et al. | |
| 2,880,096 A | 3/1959 | Hurley | |
| 2,945,769 A | 7/1960 | Gama et al. | |
| 3,168,139 A | 2/1965 | Kennedy et al. | |
| 3,454,095 A | 7/1969 | Messenger et al. | |
| 3,467,193 A | 9/1969 | Messenger | |
| 3,499,491 A | 3/1970 | Wyant et al. | |
| 3,557,876 A | 1/1971 | Tragesser | |
| 3,748,159 A | 7/1973 | George | |
| 3,876,005 A | 4/1975 | Fincher et al. | |
| 3,887,009 A | 6/1975 | Miller et al. | |
| 3,887,385 A | 6/1975 | Quist et al. | |
| 4,018,617 A * | 4/1977 | Nicholson | 106/706 |
| 4,031,184 A | 6/1977 | McCord | |
| 4,036,301 A | 7/1977 | Powers et al. | |
| 4,101,332 A * | 7/1978 | Nicholson | 588/256 |
| 4,176,720 A | 12/1979 | Wilson | |
| 4,268,316 A | 5/1981 | Wills et al. | |
| 4,341,562 A | 7/1982 | Ahlbeck | |
| RE31,190 E | 3/1983 | Detroit et al. | |
| 4,407,677 A | 10/1983 | Wills et al. | |
| 4,432,800 A | 2/1984 | Kneller et al. | |
| 4,435,216 A | 3/1984 | Diehl et al. | |
| 4,460,292 A | 7/1984 | Durham et al. | |
| 4,494,990 A | 1/1985 | Harris | |
| 4,515,635 A | 5/1985 | Rao et al. | |
| 4,519,452 A | 5/1985 | Tsao et al. | |
| 4,555,269 A | 11/1985 | Rao et al. | |
| 4,614,599 A | 9/1986 | Walker | |

(Continued)

FOREIGN PATENT DOCUMENTS

| | | |
|---|---|---|
| CA | 2336077 | 1/2000 |
| CA | 2153372 | 1/2006 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| GB | 1469954 | 4/1997 |
| JP | 52117316 | 10/1977 |
| JP | 10110487 | 4/1998 |
| RU | 2026959 | 1/1995 |
| RU | 2262497 | 10/2005 |
| SU | 1373781 | 2/1988 |
| WO | WO 83/01443 | 4/1983 |
| WO | WO 98/54108 | 12/1998 |

(Continued)

OTHER PUBLICATIONS

U.S. Appl. No. 12/263,954, filed Nov. 3, 2008, Roddy.
U.S. Appl. No. 12/264,010, filed Nov. 3, 2008, Roddy.
U.S. Appl. No. 12/283,398, filed Sep. 11, 2008, Roddy.
Bartlet-Gouedard, "A Non-Conventional Way of Developing Cement Slurry for Geothermal Wells", 2001.

(Continued)

*Primary Examiner*—Paul Marcantoni
(74) *Attorney, Agent, or Firm*—Craig W. Roddy; Tumey, LLP

(57) ABSTRACT

An embodiment of the present invention includes a method of cementing in a subterranean formation comprising: providing an extended settable composition comprising hydraulic cement, cement kiln dust, water, and a set retarding additive, wherein the extended settable composition is capable of remaining in a pumpable fluid state for at least about 1 day; adding a cement set accelerator to the extended settable composition; introducing the extended settable composition into a well bore; and allowing the extended settable composition to set. Another embodiment of the present invention includes a method of cementing in a subterranean formation comprising: providing an extended settable composition comprising hydraulic cement, cement kiln dust, water, and a set retarding additive; storing the extended settable composition; adding a cement set accelerator to the extended settable composition; introducing the extended settable composition into a well bore; and allowing the extended settable composition to set.

20 Claims, No Drawings

U.S. PATENT DOCUMENTS

| | | |
|---|---|---|
| 4,624,711 A | 11/1986 | Styron |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm et al. |
| 5,215,585 A | 6/1993 | Luthra et al. |
| 5,238,064 A | 8/1993 | Dahl et al. |
| 5,266,111 A | 11/1993 | Barbour |
| 5,295,543 A | 3/1994 | Terry et al. |
| 5,305,831 A | 4/1994 | Nahm |
| 5,314,022 A | 5/1994 | Cowan et al. |
| 5,327,968 A | 7/1994 | Onan et al. |
| 5,337,824 A | 8/1994 | Cowan |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,423,379 A | 6/1995 | Hale et al. |
| 5,439,056 A | 8/1995 | Cowan |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,673,753 A | 10/1997 | Hale et al. |
| 5,711,383 A | 1/1998 | Terry et al. |
| 5,716,910 A | 2/1998 | Totten et al. |
| 5,728,654 A | 3/1998 | Dobson et al. |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,048,053 B2 | 5/2006 | Santra et al. |
| 7,077,203 B1 | 7/2006 | Roddy et al. |
| 7,174,962 B1 | 2/2007 | Roddy et al. |
| 7,199,086 B1 * | 4/2007 | Roddy et al. ............ 507/269 |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,335,252 B2 * | 2/2008 | Roddy et al. ............ 106/707 |
| 7,337,842 B2 | 3/2008 | Roddy et al. |
| 7,338,923 B2 * | 3/2008 | Roddy et al. ............ 507/140 |
| 7,353,870 B2 | 4/2008 | Roddy et al. |
| 7,381,263 B2 * | 6/2008 | Roddy et al. ............ 106/692 |
| 7,387,675 B2 * | 6/2008 | Roddy et al. ............ 106/716 |

| | | | |
|---|---|---|---|
| 7,395,860 | B2 | 7/2008 | Roddy et al. |
| 7,445,669 | B2 * | 11/2008 | Roddy et al. ............... 106/707 |
| 7,478,675 | B2 * | 1/2009 | Roddy et al. ............... 166/293 |
| 2002/0033121 | A1 | 3/2002 | Marko |
| 2002/0073897 | A1 | 6/2002 | Trato |
| 2002/0117090 | A1 | 8/2002 | Ku |
| 2003/0116065 | A1 | 6/2003 | Griffith et al. |
| 2003/0116887 | A1 | 6/2003 | Scott |
| 2003/0167970 | A1 | 9/2003 | Polston |
| 2004/0007162 | A1 | 1/2004 | Morioka et al. |
| 2004/0040475 | A1 | 3/2004 | De La Roij et al. |
| 2004/0079260 | A1 | 4/2004 | Datta et al. |
| 2004/0107877 | A1 | 6/2004 | Getzlaf et al. |
| 2004/0108113 | A1 | 6/2004 | Luke et al. |
| 2004/0112600 | A1 | 6/2004 | Luke et al. |
| 2004/0187740 | A1 | 9/2004 | Timmons |
| 2004/0188091 | A1 | 9/2004 | Luke et al. |
| 2004/0191439 | A1 | 9/2004 | Bour et al. |
| 2004/0211562 | A1 | 10/2004 | Brothers et al. |
| 2004/0211564 | A1 | 10/2004 | Brothers et al. |
| 2004/0244650 | A1 | 12/2004 | Brothers |
| 2004/0244977 | A1 | 12/2004 | Luke et al. |
| 2004/0256102 | A1 | 12/2004 | Trato |
| 2005/0000734 | A1 | 1/2005 | Getzlaf et al. |
| 2005/0034867 | A1 | 2/2005 | Griffith et al. |
| 2005/0056191 | A1 | 3/2005 | Brothers et al. |
| 2005/0072599 | A1 | 4/2005 | Luke et al. |
| 2005/0084334 | A1 | 4/2005 | Shi et al. |
| 2005/0098317 | A1 | 5/2005 | Reddy et al. |
| 2005/0133221 | A1 | 6/2005 | Chatterji et al. |
| 2006/0025312 | A1 | 2/2006 | Santra et al. |
| 2006/0054319 | A1 | 3/2006 | Fyten et al. |
| 2006/0162926 | A1 | 7/2006 | Roddy |
| 2006/0166834 | A1 | 7/2006 | Roddy |
| 2006/0260512 | A1 | 11/2006 | Nordmeyer |
| 2007/0056475 | A1 | 3/2007 | Roddy et al. |
| 2007/0056479 | A1 | 3/2007 | Gray |
| 2007/0056733 | A1 | 3/2007 | Roddy et al. |
| 2007/0102157 | A1 | 5/2007 | Roddy et al. |
| 2007/0137528 | A1 | 6/2007 | LeRoy-Delage et al. |
| 2007/0186820 | A1 | 8/2007 | O'Hearn |
| 2008/0156491 | A1 | 7/2008 | Roddy et al. |
| 2008/0229979 | A1 | 9/2008 | Lewis et al. |
| 2009/0044726 | A1 * | 2/2009 | Brouillette et al. .......... 106/706 |
| 2009/0071650 | A1 | 3/2009 | Roddy et al. |
| 2009/0114126 | A1 * | 5/2009 | Roddy et al. ............... 106/692 |
| 2009/0124522 | A1 | 5/2009 | Roddy |
| 2009/0200029 | A1 * | 8/2009 | Roddy et al. ............... 166/293 |

FOREIGN PATENT DOCUMENTS

| | | |
|---|---|---|
| WO | WO 00/63134 | 1/2000 |
| WO | WO 03/031364 | 4/2003 |
| WO | WO 2005/047212 | 5/2005 |
| WO | WO 2005/061846 | 7/2005 |
| WO | WO2006032841 | 3/2006 |
| WO | WO2007028952 | 3/2007 |

OTHER PUBLICATIONS

Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder" dated 1999.
HES Brochure "HR-4 Cement Retarder", 1999.
HES Brochure HR-5 Cement Additive, 1998.
HES Brochure "HR-7 Cement Retarder", 1999.
HES Brochure "Pozmix A Cement Additive", 1999.
HES Brochure "Pozmix Cement and Pozmix 140".
HES Brochure "SCR-100 Cement Retarder A Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LaFarge brochure "TerraCem™ ", Aug. 2006.
LaFarge MSDS "Cement Kiln Dust", Mar. 3, 2005.
LaFarge MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.

Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/416,754 (Notice of Allowance), Jul. 2, 2007.
Office Action from U.S. Appl. No. 11/223,485 (Notice of Allowance), Aug. 3, 2007.
Office Action from U.S. Appl. No. 11/257,261, Aug. 10, 2007.
Office Action from U.S. Appl. No. 11/271,690 (Notice of Allowance), Aug. 13, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/416,754 (Notice of Allowance), Oct. 17, 2007.
Office Action from U.S. Appl. No. 11/257,261 (Notice of Allowance), Oct. 23, 2007.
Office Action from U.S. Appl. No. 11/402,741, Oct. 24, 2007.
Office Action from U.S. Appl. No. 11/223,750 (Notice of Allowance), Dec. 11, 2007.
Office Action from U.S. Appl. No. 11/402,741 (Notice of Allowance), Dec. 13, 2007.
Office Action from U.S. Appl. No. 11/223,669, Jan. 29, 2008.
Office Action from U.S. Appl. No. 11/256,824 (Notice of Allowance), Feb. 27, 2008.
Office Action from U.S. Appl. No. 11/223,703 (Notice of Allowance), Feb. 27, 2008.
Office Action from U.S. Appl. No. 11/223,669, Apr. 8, 2008.
Office Action from U.S. Appl. No. 11/223,669 (Notice of Allowance), Jun. 30, 2008.
Foreign Search Report from a Related Application, Sep. 9, 2005.
Foreign Search Report from a Related Application, Jul. 5, 2006.
Foreign Search Report from a Related Application, Oct. 27, 2006.
Foreign Search Report from a Related Application, Nov. 2, 2006.
Foreign Search Report from a Related Application, Dec. 1, 2006.
Foreign Search Report from a Related Application, Dec. 19, 2006.
Foreign Search Report from a Related Application, May 8, 2007.
Office Action from U.S. Appl. No. 12/034,886 (Issue Notification), Dec. 29, 2008.
Office Action from U.S. Appl. No. 12/263,800 dated May 1, 2009.
EPO Application No. 06794648.3 Examination Report dated Apr. 17, 2009, pp. 1-8.
EPO Application No. 06779194.7 Examination Report dated May 29, 2009, pp. 1-5.
USPTO Office Action for Application No. 12/283,398 dated Jul. 15, 2009.
USPTO Office Action for U.S. Appl. No. 12/263,800 dated Jul. 28, 2009.
USPTO Office Action for U.S. Appl. No. 12/420,630 dated Aug. 3, 2009.
PCT International Search Report and Written Opinion for International Application No. PCT/GB2009/000295 dated Feb. 3, 2009.
USPTO Notice of Allowance for U.S. Appl. No. 12/420,630 dated Sep. 14, 2009.
English language translation of Foreign Office Action for Application No. RU2008113765 dated Jul. 6, 2009.
Foreign Office Action for Canadian Patent Application No. 2621835 dated Oct. 2, 2009.
Foreign Office Action for Canadian Patent Application No. 2621832 dated Oct. 5, 2009.

* cited by examiner

EXTENDED SETTABLE COMPOSITIONS COMPRISING CEMENT KILN DUST AND ASSOCIATED METHODS

CROSS-REFERENCE TO RELATED APPLICATION

This application is a divisional application of U.S. application Ser. No. 12/034,886 entitled "Extended Settable Compositions Comprising Cement Kiln Dust and Associated Methods," filed on Feb. 21, 2008, issued as U.S. Pat. No. 7,478,675, which is a continuation-in-part of U.S. application Ser. No. 11/223,669 entitled "Settable Compositions Comprising Cement Kiln Dust and Additive(s)," filed Sep. 9, 2005, issued as U.S. Pat. No. 7,445,669, the entire disclosures of which is are incorporated herein by reference.

BACKGROUND

The present invention relates to cementing operations and, more particularly, to settable compositions comprising water and cement kiln dust ("CKD"), and associated methods of use.

Settable compositions may be used in primary cementing operations whereby pipe strings, such as casing and liners, are cemented in well bores. In performing primary cementing, a settable composition may be pumped into an annular space between the walls of a well bore and the pipe string disposed therein. The settable composition sets in the annular space, thereby forming an annular sheath of hardened cement (e.g., a cement sheath) that supports and positions the pipe string in the well bore and bonds the exterior surface of the pipe string to the walls of the well bore.

Settable compositions also may be used in remedial cementing operations, such as sealing voids in a pipe string or a cement sheath. As used herein the term "void" refers to any type of space, including fractures, holes, cracks, channels, spaces, and the like. Such voids may include: holes or cracks in the pipe strings; holes, cracks, spaces, or channels in the cement sheath; and very small spaces (commonly referred to as "microannuli") between the cement sheath and the exterior surface of the well casing or formation. Sealing such voids may prevent the undesired flow of fluids (e.g., oil, gas, water, etc.) and/or fine solids into, or from, the well bore.

The sealing of such voids, whether or not made deliberately, has been attempted by introducing a substance into the void and permitting it to remain therein to seal the void. If the substance does not fit into the void, a bridge, patch, or sheath may be formed over the void to possibly produce a termination of the undesired fluid flow. Substances used heretofore in methods to terminate the undesired passage of fluids through such voids include settable compositions comprising water and hydraulic cement, wherein the methods employ hydraulic pressure to force the settable composition into the void. Once placed into the void, the settable composition may be permitted to harden.

Remedial cementing operations also may be used to seal portions of subterranean formations or portions of gravel packs. The portions of the subterranean formation may include permeable portions of a formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. A "gravel pack" is a term commonly used to refer to a volume of particulate materials (such as sand) placed into a well bore to at least partially reduce the migration of unconsolidated formation particulates into the well bore. While screenless gravel packing operations are becoming more common, gravel packing operations commonly involve placing a gravel pack screen in the well bore neighboring a desired portion of the subterranean formation, and packing the surrounding annulus between the screen and the well bore with particulate materials that are sized to prevent and inhibit the passage of formation solids through the gravel pack with produced fluids. Among other things, this method may allow sealing of the portion of the gravel pack to prevent the undesired flow of fluids without requiring the gravel pack's removal.

Settable compositions also may be used during the drilling of the well bore in a subterranean formation. For example, in the drilling of a well bore, it may be desirable, in some instances, to change the direction of the well bore. In some instances, settable compositions may be used to facilitate this change of direction, for example, by drilling a pilot hole in a hardened mass of cement, commonly referred to as a "kickoff plug," placed in the well bore.

Certain formations may cause the drill bit to drill in a particular direction. For example, in a vertical well, this may result in an undesirable well bore deviation from vertical. In a directional well (which is drilled at an angle from vertical), after drilling an initial portion of the well bore vertically, the direction induced by the formation may make following the desired path difficult. In those and other instances, special directional drilling tools may be used, such as a whipstock, a bent sub-downhole motorized drill combination, and the like. Generally, the directional drilling tool or tools used may be orientated so that a pilot hole is produced at the desired angle to the previous well bore in a desired direction. When the pilot hole has been drilled for a short distance, the special tool or tools are removed, if required, and drilling along the new path may be resumed. To help ensure that the subsequent drilling follows the pilot hole, it may be necessary to drill the pilot hole in a kickoff plug, placed in the well bore. In those instances, prior to drilling the pilot hole, a settable composition may be introduced into the well bore and allowed to set to form a kickoff plug therein. The pilot hole then may be drilled in the kickoff plug, and the high strength of the kickoff plug helps ensure that the subsequent drilling proceeds in the direction of the pilot hole.

In certain applications, extended settable compositions have been used heretofore. As used herein, the term "extended settable composition" refers to a settable composition capable of remaining in a pumpable fluid state for an extended period of time (e.g., at least about 1 day). A fluid is considered to be in a pumpable fluid state where the fluid has a viscosity of less than 70 Bc, as measured using an FANN Atmospheric Consistometer Model 165AT (available from FANN Instrument Company, Houston, Tex.) at room temperature (for example, 78° F.). In general, the extended settable compositions comprise cement, water, and a set retarder and remain in a pumpable fluid state for an extended period of time. When desired for use, the extended settable composition should be capable of being activated whereby reasonable compressive strengths are developed. For example, a cement set accelerator may be added to the extended settable composition whereby the composition sets into a hardened mass. Among other things, the extended settable compositions of the present invention may be suitable for use in well bore applications, for example, where it is desired to prepare the settable composition in advance. This may allow, for example, the settable composition to be stored prior to its use. In addition, this may allow, for example, the settable composition to be prepared at a convenient location and then transported to the job site for use. Accordingly, capital expenditures associated with the cementing operations may be reduced due to a reduction in the need for on-site bulk storage and mixing equipment.

Settable compositions (and extended settable compositions) used heretofore commonly comprise Portland cement. Portland cement generally is a major component of the cost for the settable compositions. To reduce the cost of such settable compositions, other components may be included in the settable composition in addition to, or in place of, the Portland cement. Such components may include fly ash, slag cement, shale, metakaolin, micro-fine cement, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a settable composition that, when combined with water, may set to form a hardened mass.

During the manufacture of cement, a waste material commonly referred to as "CKD" is generated. "CKD," as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to cementing operations and, more particularly, to settable compositions comprising water and CKD, and associated methods of use.

In one embodiment, the present invention provides a method of cementing in a subterranean formation comprising: providing an extended settable composition comprising hydraulic cement, cement kiln dust, water, and a set retarding additive, wherein the extended settable composition is capable of remaining in a pumpable fluid state for at least about 1 day; adding a cement set accelerator to the extended settable composition; introducing the extended settable composition into a well bore; and allowing the extended settable composition to set.

In another embodiment, the present invention provides a method of cementing in a subterranean formation comprising: providing an extended settable composition comprising hydraulic cement, cement kiln dust, water, and a set retarding additive; storing the extended settable composition; adding a cement set accelerator to the extended settable composition; introducing the extended settable composition into a well bore; and allowing the extended settable composition to set.

In yet another embodiment, the present invention provides an extended settable composition comprising: hydraulic cement; cement kiln dust; water; and a set retarding additive, wherein the extended settable composition is capable of remaining in a pumpable fluid state for at least about 1 day.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, to settable compositions comprising water and CKD, and associated methods of use. The settable compositions of the present invention may be used in a variety of subterranean applications, including primary cementing, remedial cementing, and drilling operations.

In one embodiment, a settable composition of the present invention comprises water and CKD. In some embodiments, a settable composition of the present invention may be foamed, for example, comprising water, CKD, a gas, and a surfactant. A foamed settable composition may be used, for example, where it is desired for the settable composition to be lightweight. Other optional additives may also be included in the settable compositions of the present invention as desired, including, but not limited to, hydraulic cement, fly ash, slag cement, shale, zeolite, metakaolin, combinations thereof, and the like.

The settable compositions of the present invention should have a density suitable for a particular application as desired by those of ordinary skill in the art, with the benefit of this disclosure. In some embodiments, the settable compositions of the present invention may have a density in the range of about 8 pounds per gallon ("ppg") to about 16 ppg. In the foamed embodiments, the foamed settable compositions of the present invention may have a density in the range of about 8 ppg to about 13 ppg.

The water used in the settable compositions of the present invention may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the settable composition. In some embodiments, the water may be included in an amount sufficient to form a pumpable slurry. In some embodiments, the water may be included in the settable compositions of the present invention in an amount in the range of about 40% to about 200% by weight. As used herein, the term "by weight," when used herein to refer to the percent of a component in the settable composition, means by weight included in the settable compositions of the present invention relative to the weight of the dry components in the settable composition. Dry components generally refers to the components of the settable composition (such as the hydraulic cement, CKD, etc.) that may be dry blended prior to their combination with the water. In some embodiments, the water may be included in an amount in the range of about 40% to about 150% by weight.

The CKD should be included in the settable compositions in an amount sufficient to provide the desired compressive strength, density, and/or cost reduction. In some embodiments, the CKD may be present in the settable compositions of the present invention in an amount in the range of about 1% to 100% by weight. In some embodiments, the CKD may be present in the settable compositions of the present invention in an amount in the range of about 5% to 100% by weight. In some embodiments, the CKD may be present in the settable compositions of the present invention in an amount in the range of about 5% to about 80% by weight. In some embodiments, the CKD may be present in the settable compositions of the present invention in an amount in the range of about 10% to about 50% by weight.

The settable compositions of the present invention may optionally comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

Where present, the hydraulic cement generally may be included in the settable compositions in an amount sufficient to provide the desired compressive strength, density, and/or cost. In some embodiments, the hydraulic cement may be present in the settable compositions of the present invention in an amount in the range of 0% to about 99% by weight. In some embodiments, the hydraulic cement may be present in the settable compositions of the present invention in an amount in the range of 0% to about 95% by weight. In some embodiments, the hydraulic cement may be present in the settable compositions of the present invention in an amount in the range of about 20% to about 95% by weight. In some embodiments, the hydraulic cement may be present in the settable compositions of the present invention in an amount in the range of about 50% to about 90% by weight.

In some embodiments, a pozzolana cement that may be suitable for use comprises fly ash. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a settable composition with water. In some embodiments, lime may be mixed with Class F fly ash in an amount in the range of about 0.1% to about 25% by weight of the fly ash. In some instances, the lime may be hydrated lime. Suitable examples of fly ash include, but are not limited to, "POZMIX® A" cement additive, commercially available from Halliburton Energy Services, Inc., Duncan, Okla.

Where present, the fly ash generally may be included in the settable compositions in an amount sufficient to provide the desired compressive strength, density, and/or cost. In some embodiments, the fly ash may be present in the settable compositions of the present invention in an amount in the range of about 5% to about 75% by weight. In some embodiments, the fly ash may be present in the settable compositions of the present invention in an amount in the range of about 10% to about 60% by weight.

In some embodiments, a slag cement that may be suitable for use may comprise slag. Slag generally does not contain sufficient basic material, so slag cement further may comprise a base to produce a settable composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the settable compositions in an amount sufficient to provide the desired compressive strength, density, and/or cost. In some embodiments, the slag cement may be present in the settable compositions of the present invention in an amount in the range of 0% to about 99% by weight. In some embodiments, the slag cement may be present in the settable compositions of the present invention in an amount in the range of about 5% to about 75% by weight.

In certain embodiments, the settable compositions of the present invention further may comprise metakaolin. Generally, metakaolin is a white pozzolan that may be prepared by heating kaolin clay, for example, to temperatures in the range of about 600° to about 800° C. In some embodiments, the metakaolin may be present in the settable compositions of the present invention in an amount in the range of about 5% to about 95% by weight. In some embodiments, the metakaolin may be present in an amount in the range of about 10% to about 50% by weight.

In certain embodiments, the settable compositions of the present invention further may comprise shale. Among other things, shale included in the settable compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, "PRESSUR-SEAL® FINE LCM" material and "PRESSUR-SEAL® COARSE LCM" material, which are commercially available from TXI Energy Services, Inc., Houston, Tex. Generally, the shale may have any particle size distribution as desired for a particular application. In certain embodiments, the shale may have a particle size distribution in the range of about 37 micrometers to about 4,750 micrometers.

Where present, the shale may be included in the settable compositions of the present invention in an amount sufficient to provide the desired compressive strength, density, and/or cost. In some embodiments, the shale may be present in an amount in the range of about 5% to about 75% by weight. In some embodiments, the shale may be present in an amount in the range of about 10% to about 35% by weight. One of ordinary skill in the art, with the benefit of this disclosure, will recognize the appropriate amount of the shale to include for a chosen application.

In certain embodiments, the settable compositions of the present invention further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Patent Publication No. 2007/0056475. An example of a suitable source of zeolite is available from the C2C Zeolite Corporation of Calgary, Canada.

In some embodiments, the zeolite may be present in the settable compositions of the present invention in an amount in the range of about 5% to about 65% by weight. In certain embodiments, the zeolite may be present in an amount in the range of about 10% to about 40% by weight.

In certain embodiments, the settable compositions of the present invention further may comprise a set retarding additive. As used herein, the term "set retarding additive" refers to an additive that retards the setting of the settable compositions of the present invention. Examples of suitable set retarding additives include, but are not limited to, ammonium, alkali metals, alkaline earth metals, metal salts of sulfoalkylated lignins, hydroxycarboxy acids, copolymers that comprise acrylic acid or maleic acid, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the tradenames "HR® 4," "HR® 5,", HR® 7," "HR® 12," "HR® 15," HR® 25," "SCR™ 100," and "SCR™ 500." Generally, where used, the set retarding additive may be included in the settable compositions of the present invention in an amount sufficient to provide the desired set retardation. In some embodiments, the set retarding additive may be present in an amount in the range of about 0.1% to about 5% by weight.

Optionally, other additional additives may be added to the settable compositions of the present invention as deemed appropriate by one skilled in the art, with the benefit of this disclosure. Examples of such additives include, but are not limited to, accelerators, weight reducing additives, heavyweight additives, lost circulation materials, filtration control additives, dispersants, and combinations thereof. Suitable examples of these additives include crystalline silica compounds, amorphous silica, salts, fibers, hydratable clays, microspheres, pozzolan additives, lime, latex cement, thixotropic additives, combinations thereof and the like.

An example of a settable composition of the present invention may comprise water and CKD. As desired by one of ordinary skill in the art, with the benefit of this disclosure, such settable composition of the present invention further may comprise any of the above-listed additives, as well any of a variety of other additives suitable for use in subterranean applications.

Another example of a settable composition of the present invention may comprise water and CKD, and an additive comprising at least one of the following group: fly ash; shale; zeolite; slag cement; metakaolin; and combinations thereof. As desired by one of ordinary skill in the art, with the benefit of this disclosure, such settable composition of the present invention further may comprise any of the above-listed additives, as well any of a variety of other additives suitable for use in subterranean applications.

As mentioned previously, in certain embodiments, the settable compositions of the present invention may be foamed with a gas. In some embodiments, foamed settable compositions of the present invention may comprise water, CKD, a gas, and a surfactant. Other suitable additives, such as those discussed previously, also may be included in the foamed settable compositions of the present invention as desired by those of ordinary skill in the art, with the benefit of this disclosure. The gas used in the foamed settable compositions of the present invention may be any gas suitable for foaming a settable composition, including, but not limited to, air, nitrogen, or combinations thereof. Generally, the gas should be present in the foamed settable compositions of the present invention in an amount sufficient to form the desired foam. In certain embodiments, the gas may be present in the foamed settable compositions of the present invention in an amount in the range of about 10% to about 80% by volume of the composition.

Where foamed, the settable compositions of the present invention further comprise a surfactant. In some embodiments, the surfactant comprises a foaming and stabilizing surfactant. As used herein, a "foaming and stabilizing surfactant composition" refers to a composition that comprises one or more surfactants and, among other things, may be used to facilitate the foaming of a settable composition and also may stabilize the resultant foamed settable composition formed therewith. Any suitable foaming and stabilizing surfactant composition may be used in the settable compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is "ZONESEAL® 2000" foaming additive, commercially available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference.

Generally, the surfactant may be present in the foamed settable compositions of the present invention in an amount sufficient to provide a suitable foam. In some embodiments, the surfactant may be present in an amount in the range of about 0.8% and about 5% by volume of the water ("bvow").

In certain embodiments, the present invention provides extended settable compositions that are capable of remaining in a pumpable fluid state for an extended period of time. For example, the extended settable compositions may be capable of remaining in a pumpable fluid state for at least about 1 day or longer (e.g., at least about 5 days). When desired for use, the extended settable composition may be activated (e.g., by addition of a cement set accelerator) to thereby set into a hardened mass. By way of example, the extended settable composition, after activation, may set to a compressive strength (as determined using the procedure set forth in API Specification 10) at 140° F. of at least 100 psi in 72 hours, alternatively at least 500 psi. Among other things, the extended settable compositions of the present invention may be suitable for use in well bore applications, for example, where it is desired to prepare the cement composition in advance. By way of example, the extended settable compositions may facilitate preparation of the settable composition at a convenient location and then transport to the job site for use in the cementing operation.

An example of a suitable extended settable composition of the present invention comprises hydraulic cement, CKD, water, and a set retarding additive. Optionally, a suspending agent may be included in the extended settable composition as desired. The extended settable compositions of the present invention should have a density suitable for a particular application as desired by those of ordinary skill in the art, with the benefit of this disclosure. In some embodiments, the extended settable compositions of the present invention may have a density in the range of about 8 ppg to about 16 ppg. The extended settable composition may be foamed, for example, where it is desired for the extended settable composition to be lightweight. In the foamed embodiments, the extended settable compositions may be foamed to have a density in the range of about 8 ppg to about 12 ppg.

The water used in the extended settable compositions of the present invention may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the settable composition. In some embodiments, the water may be included in an amount sufficient to form a pumpable slurry. In some embodiments, the water may be included in the extended settable compositions of the present invention in an amount in the range of about 40% to about 200% by weight. In some embodiments, the water may be included in an amount in the range of about 40% to about 150% by weight.

Embodiments of the extended settable compositions of the present invention generally comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

The hydraulic cement generally should be included in the extended settable compositions in an amount sufficient to provide the desired compressive strength, density, and/or cost. In some embodiments, the hydraulic cement may be present in the extended settable compositions of the present invention in an amount up to about 99% by weight (e.g., about 5%, about 10%, about 15%, about 20%, about 25%, about 30%, about 35%, about 40%, about 45%, about 50%, about 60%, about 65%, about 70%, about 80%, about 85%, about 90%, about 95%, etc.). In some embodiments, the hydraulic cement may be present in an amount up to about 95% by weight. In some embodiments, the hydraulic cement may be present in an amount in the range of about 25% to about 75% by weight. In some embodiments, the hydraulic cement may be present in an amount in the range of about 50% to about 75% by weight.

Embodiments of the extended settable compositions of the present invention generally comprise CKD. The CKD generally should be included in the extended settable compositions in an amount sufficient to provide the desired compressive strength, density, and/or cost reduction. In some embodiments, the CKD may be present in the extended settable compositions of the present invention in an amount up to about 99% by weight (e.g., about 5%, about 10%, about 15%, about 20%, about 25%, about 30%, about 35%, about 40%, about 45%, about 50%, about 60%, about 65%, about 70%, about 80%, about 85%, about 90%, about 95%, etc.). In some embodiments, the CKD may be present in an amount in the range of about 5% to about 99% by weight. In some embodiments, the CKD may be present in an amount in the range of about 25% to about 75% by weight. In some embodiments, the CKD may be present in an amount in the range of about 25% to about 50% by weight.

Embodiments of the extended settable compositions of the present invention generally comprise a set retarding additive. Examples of suitable set retarding additives include, but are not limited to, organic acids, lignosulfonates, synthetic retarders and combinations thereof. It has been discovered that certain set retarding additives, such as phosphonated compounds, may not be desirable in certain applications because the settable composition may be become over retarded such that the composition does not activate and develop reasonable compressive strength. Examples of organic acids that may be included in the extended settable compositions of the present invention include, but are not limited to, tartaric acid, gluconic acid, carboxylic acids (e.g., citric acid), hydroxy carboxy acids, and combinations thereof. One example of a suitable tartaric acid is "HR®-25" cement retarder available from Halliburton Energy Services, Inc. Examples of lignosulfonates that may be included in the extended settable compositions of the present invention include, but are not limited to, a sulfomethylated lignin, calcium lignosulfonates, sodium lignosulfonates, and combinations thereof. Examples of suitable lignosulfonates include "HR®-4," "HR®-5," and "HR®-7" cement retarders available from Halliburton Energy Services, Inc. Examples of synthetic retarders that may be included in the extended settable compositions of the present invention include, but are not limited to, copolymers of acrylic acid and acrylamido-methyl-propane sulfonate polymer and copolymers of maleic anhydride and acrylamido-methyl-propane sulfonate polymer. Examples of suitable synthetic retarders include "SCR™-100" and "SCR™-500" cement retarders available from Halliburton Energy Services, Inc. Examples of suitable synthetic retarders are described in U.S. Pat. Nos. 4,941,536, 5,049,288, 5,472,051, and 5,536,311, the disclosures of which are incorporated herein by reference.

The set retarding additive should be included in the extended settable compositions of the present invention in an amount sufficient for the settable composition to remain in a pumpable fluid state for an extended period of time (e.g., at least about 1 days). In certain embodiments, the set retarding additive may be included in the extended settable composition in an amount in the range of about 0.1% to about 5% by weight. In certain embodiments, the set retarding additive may be included in the extended settable composition in an amount in the range of about 0.1% to about 1.5% by weight. Where the set retarding additive comprises tartaric acid, the tartaric acid may be in the extended settable composition in an amount in the range of about 0.2% to about 0.35% by weight, for example. Where the set retarding additive comprises a sulfomethylated lignin, the sulfomethylated lignin may be, for example, included in the extended settable composition in an amount in the range of about 0.2% to about 1% by weight. Those of ordinary skill in the art, with the benefit of this disclosure, should be able to determine an appropriate set retarding additive and amount thereof for a particular application.

As previously mentioned, at a desired time for use, the extended settable composition may be activated, for example, by addition of a cement set accelerator. Examples of suitable cement set accelerators include, but are not limited to, calcium chloride, triethanolamine, sodium silicate, zinc formate, calcium acetate, and combinations thereof. An example of a suitable sodium silicate is "ECONOLITE™" additive, available from Halliburton Energy Services, Inc. The cement set accelerator should be added to the extended settable composition in an amount sufficient to activate the extended settable composition to set into a hardened mass. In certain embodiments, the cement set accelerator may be added to the extended settable composition in an amount in the range of about 0.1% to about 4% by weight.

Optionally, embodiments of the extended settable composition further may comprise fly ash, slag cement, shale, zeolite, metakaolin, and combinations thereof. The amount of these additives that may be included in the extended settable compositions may the same as described above. Other additional additives also may be added to the extended settable compositions of the present invention as deemed appropriate by one skilled in the art, with the benefit of this disclosure. Examples of such additives include, but are not limited to, weight reducing additives, heavyweight additives, lost circulation materials, filtration control additives, dispersants, suspending agents, and combinations thereof. Suitable examples of these additives include crystalline silica compounds, amorphous silica, salts, fibers, hydratable clays, microspheres, pozzolan additives, lime, latex cement, thixotropic additives, combinations thereof and the like.

The settable compositions, including the extended settable compositions, of the present invention may be used in a variety of subterranean applications, including, but not limited to, primary cementing, remedial cementing, and drilling operations.

An example of a method of the present invention comprises providing a settable composition of the present invention comprising water and CKD; placing the settable composition into a well bore. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Another example of a method of the present invention is a method of cementing a pipe string (e.g., casing, expandable casing, liners, etc.) disposed in a well bore. An example of such a method may comprise providing a settable composition of the present invention comprising water and CKD; introducing the settable composition into the annulus between the pipe string and a wall of the well bore; and allowing the settable composition to set in the annulus to form a hardened mass. Generally, in most instances, the hardened mass should fix the pipe string in the well bore. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean application.

Another example of a method of the present invention is method of sealing a portion of a gravel pack or a portion of a subterranean formation. An example of such a method may comprise providing a settable composition of the present invention comprising water and CKD; introducing the settable composition into the portion of the gravel pack or the portion of the subterranean formation; and allowing the settable composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Another example of a method of the present invention is a method of sealing voids located in a pipe string (e.g., casing, expandable casings, liners, etc.) or in a cement sheath. Generally, the pipe string will be disposed in a well bore, and the cement sheath may be located in the annulus between the pipe string disposed in the well bore and a wall of the well bore. An example of such a method may comprise providing a settable composition comprising water and CKD; introducing the settable composition into the void; and allowing the settable composition to set to form a hardened mass in the void. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

When sealing a void in a pipe string, the methods of the present invention, in some embodiments, further may comprise locating the void in the pipe string; and isolating the void by defining a space within the pipe string in communication with the void; wherein the settable composition may be introduced into the void from the space. The void may be isolated using any suitable technique and/or apparatus, including bridge plugs, packers, and the like. The void in the pipe string may be located using any suitable technique.

When sealing a void in the cement sheath, the methods of the present invention, in some embodiments, further may comprise locating the void in the cement sheath; producing a perforation in the pipe string that intersects the void; and isolating the void by defining a space within the pipe string in communication with the void via the perforation, wherein the settable composition is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like.

Another example of a method of the present invention is a method of changing the direction of drilling a well bore. An example of such a method may comprise providing a settable composition comprising CKD; introducing the settable composition into the well bore at a location in the well bore wherein the direction of drilling is to be changed; allowing the settable composition to set to form a kickoff plug in the well bore; drilling a hole in the kickoff plug; and drilling of the well bore through the hole in the kickoff plug. In some embodiments, the settable compositions of the present invention may be foamed. As desired by one of ordinary skill in the art, with the benefit of this disclosure, the settable compositions of the present invention useful in this method further may comprise any of the above-listed additives, as well any of a variety of other additives suitable for use in subterranean applications.

Generally, the drilling operation should continue in the direction of the hole drilled through the kickoff plug. The well bore and hole in the kickoff plug may be drilled using any suitable technique, including rotary drilling, cable tool drilling, and the like. In some embodiments, one or more oriented directional drilling tools may be placed adjacent to the kickoff plug. Suitable directional drilling tools include, but are not limited to, whip-stocks, bent sub-downhole motorized drill combinations, and the like. The direction drilling tools then may be used to drill the hole in the kickoff plug so that the hole is positioned in the desired direction. Optionally, the directional drilling tool may be removed from the well bore subsequent to drilling the hole in the kickoff plug.

To facilitate a better understanding of the present invention, the following examples of certain aspects of some embodiments are given. In no way should the following examples be read to limit, or define, the scope of the invention.

EXAMPLE 1

A series of sample settable compositions were prepared at room temperature and subjected to 48-hour compressive strength tests at 140° F. in accordance with API Specification 10. The sample compositions comprised water, Class A CKD, and Class A Portland cement.

The results of the compressive strength tests are set forth in the table below.

TABLE 1

Unfoamed Compressive Strength Tests:
Class A Cement and Class A CKD

| Sample | Density (ppg) | Portland Cement Class A (% by wt) | CKD Class A (% by wt) | 48-Hour Compressive Strength at 140° F. (psi) |
|---|---|---|---|---|
| No. 1 | 14 | 0 | 100 | 228 |
| No. 2 | 15.15 | 25 | 75 | 701 |
| No. 3 | 14.84 | 50 | 50 | 1,189 |
| No. 4 | 15.62 | 75 | 25 | 3,360 |
| No. 5 | 15.6 | 100 | 0 | 2,350 |

EXAMPLE 2

Sample Compositions No. 6 and 7 were prepared at room temperature and subjected to thickening time and fluid loss tests at 140° F. and 240° F., respectively, in accordance with API Specification 10.

Sample Composition No. 6 comprised water, Class A Portland Cement (50% by weight), Class A CKD (50% by weight), "HALAD® 23" fluid loss control additive (0.75% by weight), and "HR®-5" set retarder (0.25% by weight). Accordingly, Sample Composition No. 6 had a Portland cement-to-CKD weight ratio of about 50:50. This Sample had a density of 14.84 ppg. "HALAD® 23" additive is a cellulose-based fluid loss control additive that is commercially available from Halliburton Energy Services, Inc., Duncan, Okla. "HR®-5" retarder is a lignosulfonate set retarder that is commercially available from Halliburton Energy Services, Inc., Duncan, Okla.

Sample Composition No. 7 comprised water, Class A Portland Cement (50% by weight), Class A CKD (50% by weight), "HALAD® 413" fluid loss control additive (0.75% by weight), and "HR®-12" set retarder (0.3% by weight). Accordingly, Sample Composition No. 7 had a Portland cement-to-CKD weight ratio of 50:50. This Sample had a density of 14.84 ppg. "HALAD® 413" additive is a grafted copolymer fluid loss control additive that is commercially available from Halliburton Energy Services, Inc., Duncan, Okla. "HR®-12" retarder is a mixture of a lignosulfonate and hydroxycarboxy acid set retarder that is commercially available from Halliburton Energy Services, Inc., Duncan, Okla.

The results of the fluid loss and thickening time tests are set forth in the table below.

TABLE 2

Unfoamed Thickening Time and Fluid Loss Tests:
Class A Cement and Class A CKD

| Sample | Cement-to-CKD Weight Ratio | Test Temperature (° F.) | Thickening Time to 70 BC (hr:min) | API Fluid Loss in 30 min (ml) |
|---|---|---|---|---|
| No. 6 | 50:50 | 140 | 6:06 | 147 |
| No. 7 | 50:50 | 240 | 2:20 | 220 |

EXAMPLE 3

A series of sample settable compositions were prepared at room temperature and subjected to 48-hour compressive strength tests at 140° F. in accordance with API Specification 10. The sample compositions comprised water, Class H CKD, and Class H Portland cement.

The results of the compressive strength tests are set forth in the table below.

TABLE 3

Unfoamed Compressive Strength Tests:
Class H Cement and Class H CKD

| Sample | Density (ppg) | Portland Cement Class H (% by wt) | CKD Class H (% by wt) | 48-Hour Compressive Strength at 140° F. (psi) |
|---|---|---|---|---|
| No. 8 | 15.23 | 0 | 100 | 74.9 |
| No. 9 | 15.4 | 25 | 75 | 544 |
| No. 10 | 16 | 50 | 50 | 1,745 |
| No. 11 | 16.4 | 75 | 25 | 3,250 |
| No. 12 | 16.4 | 100 | 0 | 1,931 |

EXAMPLE 4

Sample Compositions No. 13 and 14 were prepared at room temperature and subjected to thickening time and fluid loss tests at 140° F. and 240° F., respectively, in accordance with API Specification 10.

Sample Composition No. 13 comprised water, Class H Portland Cement (50% by weight), Class H CKD (50% by weight), "HALAD® 23" fluid loss control additive (0.75% by weight), and 0.25% by weight "HR®-5" set retarder (0.25% by weight). Accordingly, Sample Composition No. 13 had a Portland cement-to-CKD weight ratio of about 50:50. This Sample had a density of 16 ppg.

Sample Composition No. 14 comprised water, Class H Portland Cement (50% by weight), Class H CKD (50% by weight), "HALAD® 413" fluid loss control additive (0.75% by weight), and "HR®-12" set retarder (0.3% by weight). Accordingly, Sample Composition No. 14 had a Portland cement-to-CKD weight ratio of about 50:50. This Sample had a density of 16 ppg.

The results of the fluid loss and thickening time tests are set forth in the table below.

TABLE 4

Unfoamed Thickening Time and Fluid Loss Tests:
Class H Cement and Class H CKD

| Sample | Cement-to-CKD Weight Ratio | Test Temperature (° F.) | Thickening Time to 70 BC (hr:min) | API Fluid Loss in 30 min (ml) |
|---|---|---|---|---|
| No. 13 | 50:50 | 140 | 5:04 | 58 |
| No. 14 | 50:50 | 240 | 1:09 | 220 |

EXAMPLE 5

A series of sample settable compositions were prepared at room temperature and subjected to 48-hour compressive strength tests at 140° F. in accordance with API Specification 10. The sample compositions comprised water, Class G CKD, and Class G Portland cement.

The results of the compressive strength tests are set forth in the table below.

TABLE 5

Unfoamed Compressive Strength Tests:
Class G Cement and Class G CKD

| Sample | Density (ppg) | Portland Cement Class G (% by wt) | CKD Class G (% by wt) | 48-Hour Compressive Strength at 140° F. (psi) |
|---|---|---|---|---|
| No. 15 | 14.46 | 0 | 100 | 371 |
| No. 16 | 14.47 | 25 | 75 | 601 |
| No. 17 | 14.49 | 50 | 50 | 1,100 |
| No. 18 | 14.46 | 75 | 25 | 3,160 |
| No. 19 | 14.46 | 100 | 0 | 3,880 |

EXAMPLE 6

Sample Compositions No. 20 and 21 were prepared at room temperature and subjected to thickening time and fluid loss tests at 140° F. and 240° F., respectively, in accordance with API Specification 10.

Sample Composition No. 20 comprised water, Class G Portland Cement (50% by weight), Class G CKD (50% by weight), "HALAD® 23" fluid loss control additive (0.75% by weight), and "HR®-5" set retarder (0.25% by weight). Accordingly, Sample Composition No. 20 had a Portland cement-to-CKD weight ratio of about 50:50. This Sample had a density of 15.23 ppg.

Sample Composition No. 21 comprised water, Class G Portland Cement (50% by weight), Class G CKD (50% by weight), "HALAD® 413" fluid loss control additive (0.75% by weight), and "HR®-12" set retarder (0.3% by weight). Accordingly, Sample Composition No. 21 had a Portland cement-to-CKD weight ratio of about 50:50. This Sample had a density of 15.23 ppg.

The results of the fluid loss and thickening time tests are set forth in the table below.

TABLE 6

Unfoamed Thickening Time and Fluid Loss Tests:
Class G Cement and Class G CKD

| Sample | Cement-to-CKD Weight Ratio | Test Temperature (° F.) | Thickening Time to 70 BC (hr:min) | API Fluid Loss in 30 min (ml) |
|---|---|---|---|---|
| No. 20 | 50:50 | 140 | 3:19 | 132 |
| No. 21 | 50:50 | 240 | 1:24 | 152 |

Accordingly, Examples 1-6 indicate that settable compositions comprising Portland cement and CKD may have suitable thickening times, compressive strengths, and/or fluid loss properties for a particular application.

EXAMPLE 7

A series of foamed sample compositions were prepared in accordance with the following procedure. For each sample, a base sample composition was prepared that comprised water, Class A Portland cement, and Class A CKD. The amounts of CKD and Portland cement were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

TABLE 7

Foamed Compressive Strength Test:
Class A Cement and Class A CKD

| Sample | Base Density (ppg) | Foam Density (ppg) | Portland Cement Class A (% by wt) | CKD Class A (% by wt) | 72-Hour Compressive Strength at 140° F. (psi) |
|---|---|---|---|---|---|
| No. 22 | 14.34 | 12 | 0 | 100 | 167.6 |
| No. 23 | 14.15 | 12 | 25 | 75 | 701 |
| No. 24 | 15.03 | 12 | 50 | 50 | 1,253 |
| No. 25 | 15.62 | 12 | 75 | 25 | 1,322 |
| No. 26 | 15.65 | 12 | 100 | 0 | 1,814 |

EXAMPLE 8

A series of foamed sample compositions were prepared in accordance with the following procedure. For each sample, a base sample composition was prepared that comprised water, Class H Portland cement, and Class H CKD. The amounts of CKD and Portland cement were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

TABLE 8

Foamed Compressive Strength Test:
Class H Cement and Class H CKD

| Sample | Base Density (ppg) | Foam Density (ppg) | Portland Cement Class H (% by wt) | CKD Class H (% by wt) | 72-Hour Compressive Strength at 140° F. (psi) |
|---|---|---|---|---|---|
| No. 27 | 15.07 | 12 | 0 | 100 | 27.2 |
| No. 28 | 15.4 | 12 | 25 | 75 | 285 |
| No. 29 | 16 | 12 | 50 | 50 | 845 |
| No. 30 | 16.4 | 12 | 75 | 25 | 1,458 |
| No. 31 | 16.57 | 12 | 100 | 0 | 1,509 |

EXAMPLE 9

A series of foamed sample compositions were prepared in accordance with the following procedure. For each sample, a base sample composition was prepared that comprised water, Class G Portland cement, and Class G CKD. The amounts of CKD and Portland cement were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

TABLE 9

Foamed Compressive Strength Test:
Class G Cement and Class G CKD

| Sample | Base Density (ppg) | Foam Density (ppg) | Portland Cement Class G (% by wt) | CKD Class G (% by wt) | 72-Hour Compressive Strength at 140° F. (psi) |
|---|---|---|---|---|---|
| No. 32 | 14.32 | 12 | 0 | 100 | 181 |
| No. 33 | 14.61 | 12 | 25 | 75 | 462 |
| No. 34 | 15 | 12 | 50 | 50 | 729 |
| No. 35 | 15.43 | 12 | 75 | 25 | 1,196 |
| No. 36 | 15.91 | 12 | 100 | 0 | 1,598 |

Accordingly, Examples 7-9 indicate that foamed settable compositions comprising Portland cement and CKD may have suitable compressive strengths for a particular application.

EXAMPLE 10

A series of sample settable compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below.

TABLE 10

Unfoamed Compressive Strength Tests
Class A Cement, Class A CKD, Shale, Fly Ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| No. 37 | 26 | 0 | 0 | 61 | 13 | 1,024 |
| No. 38 | 19.5 | 6.5 | 0 | 61 | 13 | 766 |
| No. 39 | 20.7 | 5.3 | 0 | 61 | 13 | 825 |
| No. 40 | 23.3 | 2.7 | 0 | 61 | 13 | 796 |
| No. 41 | 19.4 | 3.3 | 3.3 | 61 | 13 | 717 |
| No. 42 | 20.7 | 2.65 | 2.65 | 61 | 13 | 708 |
| No. 43 | 23.3 | 1.35 | 1.35 | 61 | 13 | 404 |

[1]The vitrified shale used was "PRESSUR-SEAL ® FINE LCM" material.

EXAMPLE 11

A series of sample compositions were prepared and subjected to thickening time tests at 140° F. in accordance with API Specification 10.

Sample Composition No. 44 comprised water, Class A Portland Cement (26% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg.

Sample Composition No. 45 comprised water, Class A Portland Cement (19.5% by weight), Class A CKD (6.5% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg. The vitrified shale was "PRESSUR-SEAL® FINE LCM" material.

Sample Composition No. 46 comprised water, Class A Portland Cement (19.5% by weight), Class A CKD (3.25% by weight), vitrified shale (3.25% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg. The vitrified shale was "PRESSUR-SEAL® FINE LCM" material.

The results of the fluid loss and thickening time tests are set forth in the table below.

TABLE 11

Unfoamed Thickening Time Tests:
Class A Cement, Class A CKD, Shale, Fly ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | Thickening Time to 70 BC at 140° F. (hr:min) |
|---|---|---|---|---|---|---|
| No. 44 | 26 | 0 | 0 | 61 | 13 | 2:57 |
| No. 45 | 19.5 | 6.5 | 0 | 61 | 13 | 2:20 |
| No. 46 | 19.5 | 2.25 | 2.25 | 61 | 13 | 3:12 |

[1]The vitrified shale used was "PRESSUR-SEAL ® FINE LCM" material.

EXAMPLE 12

A series of sample settable compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below.

TABLE 12

Unfoamed Compressive Strength Tests:
Class H Cement, Class H CKD, Shale, Fly ash, and Lime

| Sample | Portland Cement Class H (% by wt) | CKD Class H (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| No. 47 | 26 | 0 | 0 | 61 | 13 | 704 |
| No. 48 | 19.5 | 6.5 | 0 | 61 | 13 | 576 |
| No. 49 | 20.7 | 5.3 | 0 | 61 | 13 | 592 |
| No. 50 | 23.3 | 2.7 | 0 | 61 | 13 | 627 |
| No. 51 | 19.4 | 3.3 | 3.3 | 61 | 13 | 626 |
| No. 52 | 20.7 | 2.65 | 2.65 | 61 | 13 | 619 |
| No. 53 | 23.3 | 1.35 | 1.35 | 61 | 13 | 594 |

[1]The vitrified shale used was "PRESSUR-SEAL ® FINE LCM" material.

EXAMPLE 13

Sample Composition No. 54 was prepared and subjected to a fluid loss test at 140° F. in accordance with API Specification 10. Sample Composition No. 54 comprised water, Class H Portland Cement (19.5% by weight), Class H CKD (3.3% by weight), vitrified shale (3.3% by weight), "POZMIX® A" cement additive (61% by weight), hydrated lime (13% by weight), "HALAD® 23" fluid loss control additive (0.6% by weight), and "HR®-5" set retarder (0.1% by weight). This Sample had a density of 14.2 ppg. Accordingly, Sample Composition No. 54 had a Portland cement-to-CKD weight ratio of 75:25. The vitrified shale was "PRESSUR-SEAL® FINE LCM" material.

The result of this fluid loss test is set forth in the table below.

TABLE 13

Unfoamed Fluid Loss Test:
Class H Cement, Class H CKD, Shale, Fly ash, and Lime

| Sample | Portland Cement Class H (% by wt) | CKD Class H (% by wt) | Vitrified Shale[1] (% by wt) | POZMIX ® A Additive (% by wt) | Hydrated Lime (% by wt) | Fluid Loss in 30 min API at 140° F. (ml) |
|---|---|---|---|---|---|---|
| No. 54 | 19.5 | 3.3 | 3.3 | 61 | 13 | 117 |

[1] The vitrified shale used was "PRESSUR-SEAL ® FINE LCM" material.

EXAMPLE 14

A series of sample settable compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below.

TABLE 14

Unfoamed Compressive Strength Tests:
Class G Cement, Class G CKD, Shale, Fly ash, and Lime

| Sample | Portland Cement Class G (% by wt) | CKD Class G (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| No. 55 | 26 | 0 | 0 | 61 | 13 | 491 |
| No. 56 | 19.5 | 6.5 | 0 | 61 | 13 | 526 |
| No. 57 | 20.7 | 5.3 | 0 | 61 | 13 | 474 |
| No. 58 | 23.3 | 2.7 | 0 | 61 | 13 | 462 |
| No. 59 | 19.4 | 3.3 | 3.3 | 61 | 13 | 523 |
| No. 60 | 20.7 | 2.65 | 2.65 | 61 | 13 | 563 |

[1] The vitrified shale used was "PRESSUR-SEAL ® FINE LCM" material.

Accordingly, Examples 10-14 indicate that settable compositions comprising Portland cement, CKD, fly ash, hydrated lime, and optionally vitrified shale may have suitable compressive strengths, thickening times, and/or fluid loss properties for a particular application.

EXAMPLE 15

A series of foamed sample compositions were prepared in accordance with the following procedure. For each sample, a base sample composition was prepared that comprised water, Class A Portland cement, Class A CKD, vitrified shale, "POZMIX® A" cement additive (61% by weight), and hydrated lime (13% by weight). This Sample had a density of 14.2 ppg. The vitrified shale used was "PRESSUR-SEAL® FINE LCM" material. The amounts of CKD, Portland cement, and vitrified shale were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 10-day compressive strength tests at 140° F. in accordance with API Specification 10.

The results of the compressive strength tests are set forth in the table below.

TABLE 15

Foamed Compressive Strength Tests:
Class A Cement, Class A CKD, Shale, Fly ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 10-Day Compressive Strength at 140° F. (psi) |
|---|---|---|---|---|---|---|
| No. 61 | 26 | 0 | 0 | 61 | 13 | 1,153 |
| No. 62 | 19.5 | 6.5 | 0 | 61 | 13 | 1,151 |
| No. 63 | 20.7 | 5.3 | 0 | 61 | 13 | 1,093 |
| No. 64 | 23.3 | 2.7 | 0 | 61 | 13 | 950 |

TABLE 15-continued

Foamed Compressive Strength Tests:
Class A Cement, Class A CKD, Shale, Fly ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 10-Day Compressive Strength at 140° F. (psi) |
|---|---|---|---|---|---|---|
| No. 65 | 19.4 | 3.3 | 3.3 | 61 | 13 | 1,161 |
| No. 66 | 20.7 | 2.65 | 2.65 | 61 | 13 | 1,009 |
| No. 67 | 23.3 | 1.35 | 1.35 | 61 | 13 | 1,231 |

[1]The vitrified shale used was "PRESSUR-SEAL ® FINE LCM" material.

EXAMPLE 16

A series of foamed sample compositions were prepared in accordance with the following procedure. For each sample, a base sample composition was prepared that comprised water, Class A Portland cement, Class A CKD, vitrified shale, "POZMIX® A" cement additive (61% by weight), and hydrated lime (13% by weight). This Sample had a density of 14.2 ppg. The vitrified shale used was "PRESSUR-SEAL® FINE LCM" material. The amounts of CKD, Portland cement, and vitrified shale were varied as shown in the table below. "ZONESEAL® 2000" foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

TABLE 16

Foamed Compressive Strength Tests:
Class A Cement, Class A CKD, Shale, Fly Ash, and Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 72-Hour Compressive Strength at 140° F. (psi) |
|---|---|---|---|---|---|---|
| No. 68 | 26 | 0 | 0 | 61 | 13 | 1,057 |
| No. 69 | 19.5 | 6.5 | 0 | 61 | 13 | 969 |
| No. 70 | 20.7 | 5.3 | 0 | 61 | 13 | 984 |
| No. 71 | 19.4 | 3.3 | 3.3 | 61 | 13 | 921 |
| No. 72 | 20.7 | 2.65 | 2.65 | 61 | 13 | 811 |
| No. 73 | 23.3 | 1.35 | 1.35 | 61 | 13 | 969 |

[1]The vitrified shale used was "PRESSUR-SEAL ® FINE LCM" material.

EXAMPLE 17

Foamed Sample Composition No. 74 was prepared in accordance with the following procedure. A base sample composition was prepared that comprised water, Class G Portland cement (19.5% by weight), Class G CKD (6.5% by weight), "POZMIX® A" cement additive (61% by weight), and hydrated lime (13% by weight). This base sample had a density of 14.2 ppg. "ZONESEAL® 2000" foaming additive was then added to each base sample composition in an amount of 2% bvow. Next, the base sample was foamed down to about 12 ppg. After preparation, the resulting Foamed Sample Composition was subjected to a 72-hour compressive strength test at 140° F. in accordance with API Specification 10.

The result of the compressive strength test is set forth in the table below.

TABLE 17

Foamed Compressive Strength Tests:
Class G Cement, Class G CKD, Fly Ash, and Lime

| Sample | Portland Cement Class G (by wt) | CKD Class G (by wt) | POZMIX ® A Additive (by wt) | Hydrated Lime (by wt) | 72-Hour Compressive Strength at 140° F. (psi) |
|---|---|---|---|---|---|
| No. 74 | 19.5 | 6.5 | 61 | 13 | 777 |

Accordingly, Examples 15-17 indicate that foamed settable compositions comprising Portland cement, CKD, fly ash, hydrated lime, and optionally vitrified shale may have suitable compressive strengths for a particular application.

EXAMPLE 18

A series of sample settable compositions were prepared at room temperature and subjected to 24-hour compressive strength tests at 180° F. in accordance with API Specification 10. The sample compositions comprised water, Class A CKD, Class A Portland cement, zeolite, vitrified shale, and hydrated lime. The vitrified shale used was "PRESSUR-SEAL® FINE LCM" material. The amount of each component was varied as shown in the table below.

The results of the compressive strength tests are set forth in the table below.

TABLE 18

Unfoamed Compressive Strength Tests:
Class A Cement, Class A CKD, Zeolite, Shale, and Lime

| Sample | Density (ppg) | Portland Cement Class A (% by wt) | CKD Class A (% by wt) | Zeolite (% by wt) | Vitrified Shale[1] (% by wt) | Hydrated Lime (% by wt) | 24-Hour Compressive Strength at 180° F. (psi) |
|---|---|---|---|---|---|---|---|
| No. 75 | 13.3 | 50 | 25 | 25 | 0 | 0 | 1,915 |
| No. 76 | 12.75 | 50 | 25 | 12.5 | 12.5 | 0 | 2,190 |
| No. 77 | 11.6 | 0 | 75 | 10 | 25 | 0 | 31.6 |
| No. 78 | 12.8 | 25 | 50 | 23.5 | 0 | 0 | 875 |
| No. 79 | 12.5 | 25 | 50 | 12.5 | 12.5 | 0 | 923 |
| No. 80 | 11.5 | 0 | 70 | 10 | 15 | 5 | 116.4 |

[1]The vitrified shale used was "PRESSUR-SEAL ® FINE LCM" material.

EXAMPLE 19

Foamed Sample Composition No. 81 was prepared in accordance with the following procedure. A base sample composition was prepared that comprised water, Class A Portland cement, Class A CKD, and zeolite. This base sample had a density of 14.2 ppg. "ZONESEAL® 2000" foaming additive was then added in an amount of 2% bvow. Next, the base sample was foamed down to about 12 ppg. After preparation, the resulting Foamed Sample Composition was subjected to a 72-hour compressive strength test at 140° F. in accordance with API Specification 10.

The result of the compressive strength test is set forth in the table below.

TABLE 19

Foamed Compressive Strength Tests:
Class A Cement, Class A CKD, and Zeolite

| Sample | Base Density (ppg) | Foam Density (ppg) | Portland Cement Class A (% by wt) | CKD Class A (% by wt) | Zeolite (% by wt) | 72-Hour Compressive Strength at 140° F. (psi) |
|---|---|---|---|---|---|---|
| No. 81 | 13.35 | 12 | 50 | 25 | 25 | 972 |

EXAMPLE 20

Sample Composition No. 82 was prepared at room temperature and subjected to a 24-hour compressive strength test at 180° F. in accordance with API Specification 10. Sample Composition No. 82 comprised water, Portland Class H Cement, Class H CKD, Zeolite, and vitrified shale. The vitrified shale used was "PRESSUR-SEAL® FINE LCM" material.

The result of the compressive strength test is set forth in the table below.

TABLE 20

Unfoamed Compressive Strength Tests:
Class H Cement, Class H CKD, Zeolite and Shale

| Sample | Density (ppg) | Portland Cement Class H (% by wt) | CKD Class H (% by wt) | Zeolite (% by wt) | Vitrified Shale[1] (% by wt) | 24-Hour Compressive Strength at 180° F. (psi) |
|---|---|---|---|---|---|---|
| No. 82 | 15.2 | 50 | 25 | 12.5 | 12.5 | 2,280 |

[1]The vitrified shale used was "PRESSUR-SEAL ® FINE LCM" material.

EXAMPLE 21

Sample Composition No. 83 was prepared at room temperature and subjected to thickening time and fluid loss tests at 140° F. in accordance with API Specification 10. Sample Composition No. 83 comprised Class A Portland Cement (50% by weight), Class A CKD (25% by weight), zeolite (12.5% by weight), vitrified shale (12.5% by weight), "HALAD® 23" fluid loss control additive (0.75% by weight), and "HR®-5" set retarder (0.5% by weight). This Sample had a density of 12.75 ppg. The vitrified shale used was "PRESSUR-SEAL® FINE LCM" material.

The results of the fluid loss and thickening time tests are set forth in the table below.

TABLE 21

Unfoamed Thickening Time and Fluid Loss Tests:
Class A Cement, Class A CKD, Zeolite and Shale

| Sample | Portland Cement Class A (% by wt) | CKD Class A (% by wt) | Zeolite (% by wt) | Vitrified Shale[1] (% by wt) | Thickening Time to 70 BC at 140° F. (hr:min) | Fluid Loss in 30 min at 140° F. (ml) |
|---|---|---|---|---|---|---|
| No. 83 | 50 | 25 | 12.5 | 12.5 | 8:54 | 196 |

[1]The vitrified shale used was "PRESSUR-SEAL ® FINE LCM" material.

Accordingly, Examples 18-21 indicate that foamed and unfoamed settable compositions comprising Portland cement, CKD, zeolite, and optionally vitrified shale may have suitable compressive strengths for a particular application.

EXAMPLE 22

A series of sample settable compositions were prepared at room temperature and subjected to 24-hour compressive strength tests at 190° F. in accordance with API Specification 10. The sample compositions comprised water, slag cement, Class H CKD, Class H Portland cement, sodium carbonate, and hydrated lime. The slag cement contained sodium carbonate in an amount of 6% by weight. The amount of each component was varied as shown in the table below.

The results of the compressive strength tests are set forth in the table below.

TABLE 22

Unfoamed Compressive Strength Tests:
Class H Cement, Class H CKD, Slag Cement, and Lime

| Sample | Density (ppg) | Portland Cement Class H (% by wt) | CKD Class H (% by wt) | Slag Cement (% by wt) | Hydrated Lime (% by wt) | 24-Hour Compressive Strength at 190° F. (psi) |
|---|---|---|---|---|---|---|
| No. 84 | 13.2 | 0 | 50 | 45 | 5 | 123.6 |
| No. 85 | 13.6 | 0 | 50 | 50 | 0 | 170.3 |
| No. 86 | 14 | 30 | 50 | 20 | 0 | 183.2 |
| No. 87 | 15 | 30 | 20 | 50 | 0 | 563 |

EXAMPLE 23

A series of foamed sample settable compositions were prepared at room temperature and subjected to 72-hour compressive strength tests at 140° F. in accordance with API Specification 10. For each sample, a base sample composition comprised water, slag cement, Class H CKD, Class H Portland cement, and hydrated lime. The amount of each component was varied as shown in the table below. The slag cement contained sodium carbonate in an amount of 6% by weight. "ZONESEAL® 2000" foaming additive was then added to each base sample composition in an amount of 2% bvow. Next, each base sample composition was foamed down to about 11 ppg. After preparation, the resulting Foamed Sample Composition was subjected to a 72-hour compressive strength test at 140° F. in accordance with API Specification 10.

The result of the compressive strength tests are set forth in the table below.

TABLE 23

Foamed Compressive Strength Tests:
Class H Cement, Class H CKD, Slag Cement, and Lime

| Sample | Base Density (ppg) | Foam Density (ppg) | Portland Cement Class H (% by wt) | CKD Class H (% by wt) | Slag Cement (% by wt) | Hydrated Lime (% by wt) | 72-Hour Compressive Strength at 140° F. (psi) |
|---|---|---|---|---|---|---|---|
| No. 88 | 13.63 | 11 | 0 | 50 | 45 | 5 | 148.9 |
| No. 89 | 13.68 | 11 | 0 | 50 | 50 | 0 | 161.1 |
| No. 90 | 14.07 | 11 | 30 | 50 | 20 | 0 | 125 |

Accordingly, Examples 22-23 indicate that foamed and unfoamed settable compositions comprising CKD, slag cement, optionally hydraulic cement, and optionally hydrated lime may have suitable compressive strengths for a particular application.

EXAMPLE 24

A series of sample settable compositions were prepared at room temperature and subjected to 24-hour compressive strength tests at 180° F. in accordance with API Specification 10. The sample compositions comprised water, Portland Cement, CKD, metakaolin, and vitrified shale. The amount of each component was varied as shown in the table below. The vitrified shale used was "PRESSUR-SEAL® FINE LCM" material. Class A Portland Cement was used for this series of tests, except that Class H Portland Cement was used in Sample No. 93. Class A CKD was used for this series of tests, except that Class H CKD was used in Sample No. 93.

The results of the compressive strength tests are set forth in the table below.

TABLE 24

Compressive Strength Tests:
Cement CKD, Metakaolin, and Shale

| Sample | Density (ppg) | Portland Cement (% by wt) | CKD (% by wt) | Metakaolin (% by wt) | Vitrified Shale[1] (% by wt) | 24-Hour Compressive Strength at 180° F. (psi) |
|---|---|---|---|---|---|---|
| No. 91 | 12.75 | 50 | 25 | 12.5 | 12.5 | 1,560 |
| No. 92 | 13.5 | 50 | 25 | 25 | 0 | 1,082 |
| No. 93 | 13 | 25 | 50 | 12.5 | 12.5 | 1,410 |

[1]The vitrified shale used was "PRESSUR-SEAL ® FINE LCM" material.

EXAMPLE 25

A series of foamed sample settable compositions were prepared at room temperature and subjected to 72-hour compressive strength tests at 180° F. in accordance with API Specification 10. For each sample, a base sample composition was prepared that comprised water, Portland Cement, CKD, metakaolin, and vitrified shale. The amount of each component was varied as shown in the table below. The vitrified shale used was "PRESSUR-SEAL® FINE LCM" material. Class A Portland Cement was used for this series of tests, except that Class H Portland Cement was used in Sample No. 96. Class A CKD was used for this series of tests, except that Class H CKD was used in Sample No. 96. "ZONESEAL® 2000" foaming additive was then added to each base sample composition in an amount of 2% bvow. Next, each base sample composition was foamed down to the density shown in the table below.

The results of the compressive strength tests are set forth in the table below.

TABLE 25

Foamed Compressive Strength Tests:
Cement, CKD, Metakaolin, and Shale

| Sample | Base Density (ppg) | Foam Density (ppg) | Portland Cement (% by wt) | CKD (% by wt) | Metakaolin (% by wt) | Vitrified Shale[1] (% by wt) | 72-Hour Compressive Strength at 180° F. (psi) |
|---|---|---|---|---|---|---|---|
| No. 94 | 12.75 | 9.85 | 50 | 25 | 12.5 | 12.5 | 651 |
| No. 95 | 13.5 | 9.84 | 50 | 25 | 25 | 0 | 512 |
| No. 96 | 13 | 9.57 | 25 | 50 | 12.5 | 12.5 | 559 |

[1] The vitrified shale used was "PRESSUR-SEAL ® FINE LCM" material.

Accordingly, Examples 24-25 indicate that foamed and unfoamed settable compositions comprising hydraulic cement, CKD, metakaolin, and optionally vitrified shale may have suitable compressive strengths for a particular application.

EXAMPLE 26

A series of extended settable compositions were prepared at room temperature and subjected to fluid state, thickening time, and compressive strength tests. The sample compositions prepared for this example had a density of 14 ppg and comprised API Class A Portland cement in an amount of 25% to 75% by weight of cement ("bwc"), API Class A CKD in an amount of 25% to 75% bwc, a fluid loss control additive in an amount of 1% bwc, and a set retarding additive. For these tests, by weight of cement (or "bwc") means the amount of the component relative to the combined weight of cement and CKD in the sample composition. The fluid loss control additive included in each sample composition was "HALAD® 23" fluid loss control additive. The type and quantity of the set retarding additive included in each sample is set forth in the table below.

For the fluid state tests, the extended settable compositions were prepared and placed in sealed plastic containers at room temperature (e.g., about 78° F.). The extended settable compositions were observed on a daily basis for flowability over time periods up to 7 days. Observing the compositions for flowability involved shaking the plastic container and observing whether the composition was flowable. For this series of tests, the composition was considered to be in a fluid state based on visual observations, wherein the fluid was flowable when the plastic container was shaken. The results for the fluid state tests are set forth in the table below.

For the thickening time and compressive strength tests, the extended settable compositions were combined with various cement set accelerators and mixed in a Waring blender and conditioned in an atmospheric consistometer to the test temperatures. After conditioning for 20 minutes, the extended settable compositions were tested for thickening times to 70 BC and 72-hour compressive strengths at 140° F., in accordance with the procedures set forth in API Specification 10. The results for the thickening time and compressive strength tests are set forth in the table below.

TABLE 26

Fluid State, Thickening Time, and Compressive Strength Test: Extended Settable Compositions

| Sample | Portland Cement (% bwc) | CKD (% bwc) | Fluid Loss Control Additive[1] (% bwc) | Amino Tri Methylene Phosponic Acid[2] (gal/sack) | Tartaric Acid[3] (% bwc) | Sulfomethylated Lignin[4] (% bwc) | Liquid Sodium Silicate[5] (% bwc) | CaCl$_2$ (% bwc) | Fluid State | Thick. Time (Hr:min) | 72-Hour Comp. Strength at 140° F. (psi) |
|---|---|---|---|---|---|---|---|---|---|---|---|
| No. 97 | 25 | 75 | 1 | 0.098 | — | — | — | 0.5 | n/d[6] | 17:00+ | n/d |
| No. 98 | 25 | 75 | 1 | 0.098 | — | — | — | 1 | n/d | 20:00+ | n/d |
| No. 99 | 25 | 75 | 1 | 0.098 | — | — | — | 4 | n/d | 0:11 | n/d |
| No. 100 | 25 | 75 | 1 | 0.098 | — | — | — | 2 | n/d | 21:00+ | n/d |
| No. 101 | 25 | 75 | 1 | 0.098 | — | — | — | 3 | n/d | 21:00+ | n/d |
| No. 102 | 25 | 75 | 1 | 0.098 | — | — | — | 3.5 | n/d | 31:01 | n/d |
| No. 103 | 50 | 50 | 1 | 0.098 | — | — | — | 2 | n/d | 22:00+ | n/d |
| No. 104 | 50 | 50 | 1 | 0.098 | — | — | — | 3 | n/d | 20:00 | n/d |
| No. 105 | 50 | 50 | 1 | — | — | — | — | 4 | n/d | 1:32 | n/d |
| No. 106 | 50 | 50 | 1 | 0.098 | — | — | — | 4 | n/d | 13:52 | n/d |
| No. 107 | 75 | 25 | 1 | 0.098 | — | — | — | 4 | n/d | 31:48 | n/d |
| No. 108 | 25 | 75 | 1 | — | 0.5 | — | — | 2 | n/d | 22:00+ | n/d |
| No. 109 | 25 | 75 | 1 | — | 0.5 | — | — | 4 | n/d | 48:00+ | n/d |
| No. 110 | 50 | 50 | 1 | — | 0.25 | — | — | 4 | 7 days+ | 13:26 | 635 |
| No. 111 | 50 | 50 | 1 | — | 0.5 | — | — | 4 | n/d | 47:00+ | n/d |
| No. 112 | 50 | 50 | 1 | — | 0.25 | — | 2 | — | n/d | n/d[7] | n/d |
| No. 113 | 50 | 50 | 1 | — | 0.25 | — | 1.5 | — | n/d | n/d[8] | n/d |
| No. 114 | 50 | 50 | 1 | — | 0.25 | — | 1 | — | 7 days+ | 3:09 | 1,549 |
| No. 115 | 50 | 50 | 1 | — | — | 1 | — | 4 | 5 days | 5:24 | 1,200 |

TABLE 26-continued

Fluid State, Thickening Time, and Compressive Strength Test:
Extended Settable Compositions

| Sample | Portland Cement (% bwc) | CKD (% bwc) | Fluid Loss Control Additive[1] (% bwc) | Set Retarding Additive | | | Cement Set Accelerator | | Fluid State | Thick. Time (Hr:min) | 72-Hour Comp. Strength at 140° F. (psi) |
| | | | | Amino Tri Methylene Phosponic Acid[2] (gal/sack) | Tartaric Acid[3] (% bwc) | Sulfomethylated Lignin[4] (% bwc) | Liquid Sodium Silicate[5] (% bwc) | CaCl$_2$ (% bwc) | | | |
| --- | --- | --- | --- | --- | --- | --- | --- | --- | --- | --- | --- |
| No. 116 | 50 | 50 | 1 | — | — | 1.5 | — | 4 | 6 days | 7:55 | 1,085 |
| No. 117 | 75 | 25 | 1 | — | 0.25 | — | — | 4 | 6 days | 9:58 | 956 |
| No. 118 | 25 | 75 | 1 | — | 0.25 | — | — | 4 | 7 days | 19:44 | 195.6 |

[1]"HALAD ®-23" fluid loss control additive
[2]"DEQUEST ® 2000" series additive
[3]"HR ®-25" cement retarder
[4]"HR ®-5" cement retarder
[5]"ECONOLITE ™" additive,
[6]Since sample composition showing thickening time problems were unacceptable, fluid state and compressive strength were not determined.
[7]Sample No. 112 was not mixable so thickening times, fluid state, and compressive strength were not determined.
[8]Sample No. 113 was too thick so thickening times, fluid state, and compressive strength were not determined.

Accordingly, Example 26 indicates that extended settable compositions retarded with amino trimethylene phosphonic acid and accelerated with calcium chloride have unacceptable thickening times. Furthermore, extended settable compositions retarded with varying concentrations of sulfomethylated lignins may remain in a fluid state for at least 5 days and once accelerated with calcium chloride have acceptable thickening times. In addition, extended settable compositions retarded with tartaric acid in an amount of about 0.25% bwc may remain in a fluid state for at least 7 days and once accelerated with 4% bwc calcium chloride may have acceptable thickening times and set to at least 195 psi in 72 hours. Moreover, extended settable compositions retarded with tartaric acid in an amount of about 0.25% bwc may remain in a fluid state for at least 7 days and once accelerated with 1% bwc sodium silicate may have acceptable thickening times. In contrast, extended settable compositions retarded with tartaric acid in an amount of about 0.5% bwc and accelerated with varying amounts of calcium chloride had unacceptable thickening times.

EXAMPLE 27

A series of extended settable compositions were prepared at room temperature and subjected to fluid loss and rheology tests. The sample compositions prepared for this example had a density of 14 ppg and comprised API Class A Portland cement in an amount of 25% to 75% bwc, API Class A CKD in an amount of 25% to 75% bwc, a fluid loss control additive in an amount of 1% bwc, varying amounts of a set retarding additive, and varying amounts of a cement set accelerator. For these tests, by weight of cement (or "bwc") means the amount of the component relative to the combined weight of cement and CKD in the sample composition. The fluid loss control additive included in each sample composition was "HALAD® 23" fluid loss control additive.

The extended settable compositions were mixed in a Waring blender and conditioned in an atmospheric consistometer to the test temperature. After conditioning, the rheology of the compositions were determined in accordance with the procedure set forth in API Specification 10. Furthermore, the compositions were also tested for fluid loss in accordance with the procedure set forth in API Specification 10.

TABLE 27

Rheology and Fluid Loss Tests:
Extended Settable Compositions

| Sample | Portland Cement (% bwc) | CKD (% bwc) | Fluid Loss Control Additive[1] (% bwc) | Set Retarding Additive | | Calcium Chloride (% bwc) | Temp. (° F.) | Fluid Loss (cc/30 min) | Rheology 300-200-100-60-30-6-3-600 |
| | | | | Amino Tri Methylene Phosponic Acid[2] (gal/sack) | Tartaric Acid[3] (% bwc) | | | | |
| --- | --- | --- | --- | --- | --- | --- | --- | --- | --- |
| No. 119 | 25 | 75 | 1 | 0.098 | — | 0.5 | 80 | n/a | 157-115-68-48-30-15-13-267 |
| | | | | | | | 140 | 96 | 135-84-49-33-21-9-7-178 |
| No. 120 | 50 | 50 | 1 | 0.098 | — | 0.5 | 80 | n/a | 126-90-52-35-21-11-9-212 |
| | | | | | | | 140 | 100 | 100-64-36-24-14-4-3-142 |
| No. 121 | 75 | 25 | 1 | 0.098 | — | 0.5 | 80 | n/a | 91-63-35-23-13-4-3-151 |
| | | | | | | | 140 | 42 | 50-32-17-11-6-1-0-79 |
| No. 122 | 25 | 75 | 1 | — | 0.25 | 4 | 80 | n/a | 145-103-60-42-28-17-16-223 |
| | | | | | | | 140 | 200 | 110-79-47-33-22-11-10-164 |

TABLE 27-continued

Rheology and Fluid Loss Tests:
Extended Settable Compositions

| Sample | Portland Cement (% bwc) | CKD (% bwc) | Fluid Loss Control Additive[1] (% bwc) | Set Retarding Additive Amino Tri Methylene Phosponic Acid[2] (gal/sack) | Set Retarding Additive Tartaric Acid[3] (% bwc) | Calcium Chloride (% bwc) | Temp. (° F.) | Fluid Loss (cc/30 min) | Rheology 300-200-100-60-30-6-3-600 |
|---|---|---|---|---|---|---|---|---|---|
| No. 123 | 50 | 50 | 1 | — | 0.25 | 4 | 80 | n/a | 109-78-46-33-22-14-14-176 |
|  |  |  |  |  |  |  | 140 | 233 | 120-86-56-42-32-22-21-175 |
| No. 124 | 75 | 25 | 1 | — | 0.25 | 4 | 80 | n/a | 69-50-30-20-13-6-6-123 |
|  |  |  |  |  |  |  | 140 | 232 | 91-66-44-34-26-19-18-128 |

[1] "HALAD ®-23" fluid loss control additive
[2] "DEQUEST ® 2000" series additive
[3] "HR ®-25" cement retarder Accordingly, Example 27 indicates that extended settable compositions may have suitable rheologies and fluid loss for a particular application.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by any amount (e.g., 1 percent, 2 percent, 5 percent, or, sometimes, 10 to 20 percent). Whenever a numerical range, R, with a lower limit, RL, and an upper limit, RU, is disclosed, any number falling within the range is specifically disclosed. In particular, the following numbers within the range are specifically disclosed: $R=RL+k*(RU-RL)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. An extended settable composition comprising:
   hydraulic cement in an amount of about 25% to about 75% by weight, wherein the hydraulic cement comprises a cement selected from the group consisting of Portland cement, pozzolana cement, gypsum cement, high alumina content cement, slag cement, silica cement, and any combination thereof,
   cement kiln dust in an amount of about 25% to about 75% by weight,
   a set retarding additive in an amount of about 0.1% to about 5% by weight, and
   water, wherein the extended settable composition is capable of remaining in a pumpable fluid state for at least about 1 day.

2. The extended settable composition of claim 1 wherein the extended settable composition is capable of remaining in a pumpable fluid state for at least about 5 days.

3. The extended settable composition of claim 1 wherein the density of the extended settable composition is in the range of from about 8 pounds per gallon to about 16 pounds per gallon.

4. The extended settable composition of claim 1 wherein the water comprises water selected from the group consisting of freshwater, saltwater, brine, seawater, and any combination thereof.

5. The extended settable composition of claim 1 wherein the water is present in the extended settable composition in an amount in the range of from about 40% to about 150% by weight.

6. The extended settable composition of claim 1 wherein the set retarding additive comprises a set retarding additive selected from the group consisting of an organic acid, a lignosulfonate, a synthetic retarder, and any combination thereof.

7. The extended settable composition of claim 1 wherein the set retarding additive comprises tartaric acid.

8. The extended settable composition of claim 1 wherein the set retarding additive comprises a sulfomethylated lignin.

9. The extended settable composition of claim 1 wherein the extended settable composition comprises an additive selected from the group consisting of fly ash, slag cement, shale, zeolite, metakaolin, and any combination thereof.

10. An extended settable composition comprising:
   hydraulic cement in an amount of about 25% to about 75% by weight, wherein the hydraulic cement comprises a cement selected from the around consisting of Portland cement, pozzolana cement, gypsum cement, high alumina content cement, slag cement, silica cement, and any combination thereof,
   cement kiln dust in an amount of about 25% to about 75% by weight,
   a set retarding additive in an amount of about 0.1% to about 5% by weight, wherein the set retarding additive comprises tartaric acid, and water, wherein the extended settable composition is capable of remaining in a pumpable fluid state for at least about 5 days.

11. The extended settable composition of claim 10 wherein the density of the composition is in the range of from about 8 pounds per gallon to about 16 pounds per gallon.

12. The extended settable composition of claim 10 wherein the water comprises water selected from the group consisting of freshwater, saltwater, brine, seawater, and any combination thereof.

13. The extended settable composition of claim 10 wherein the water is present in the composition in an amount in the range of from about 40% to about 150% by weight.

14. The extended settable composition of claim 10 wherein the extended settable composition comprises an additive selected from the group consisting of fly ash, slag cement, shale, zeolite, metakaolin, and any combination thereof.

15. The extended settable composition of claim 10 wherein the hydraulic cement comprises the Portland cement.

16. The extended settable composition of claim 10 wherein the extended settable composition further comprises a fluid loss control additive.

17. The extended settable composition of claim 10 wherein the extended settable composition further comprises an additive selected from the group consisting of a weight reducing additive, a heavyweight additive, a lost circulation material, a filtration control additive, a dispersant, a suspending agent, and any combination thereof 18. The extended settable composition of claim 1 wherein the hydraulic cement comprises the Portland cement.

19. The extended settable composition of claim 1 wherein the extended settable composition further comprises a fluid loss control additive.

20. The extended settable composition of claim 1 wherein the extended settable composition further comprises an additive selected from the group consisting of a weight reducing additive, a heavyweight additive, a lost circulation material, a filtration control additive, a dispersant, a suspending agent, and any combination thereof.

* * * * *